United States Patent Office
2,770,980
Patented Nov. 20, 1956

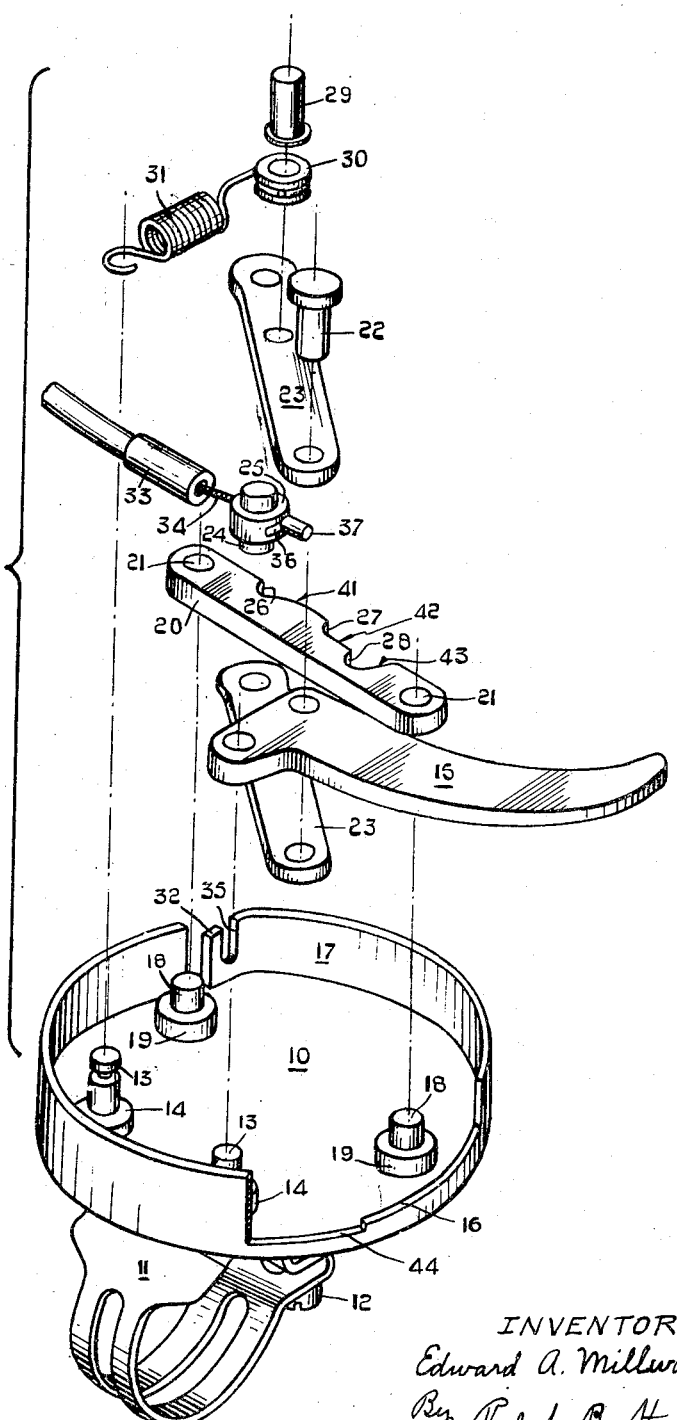

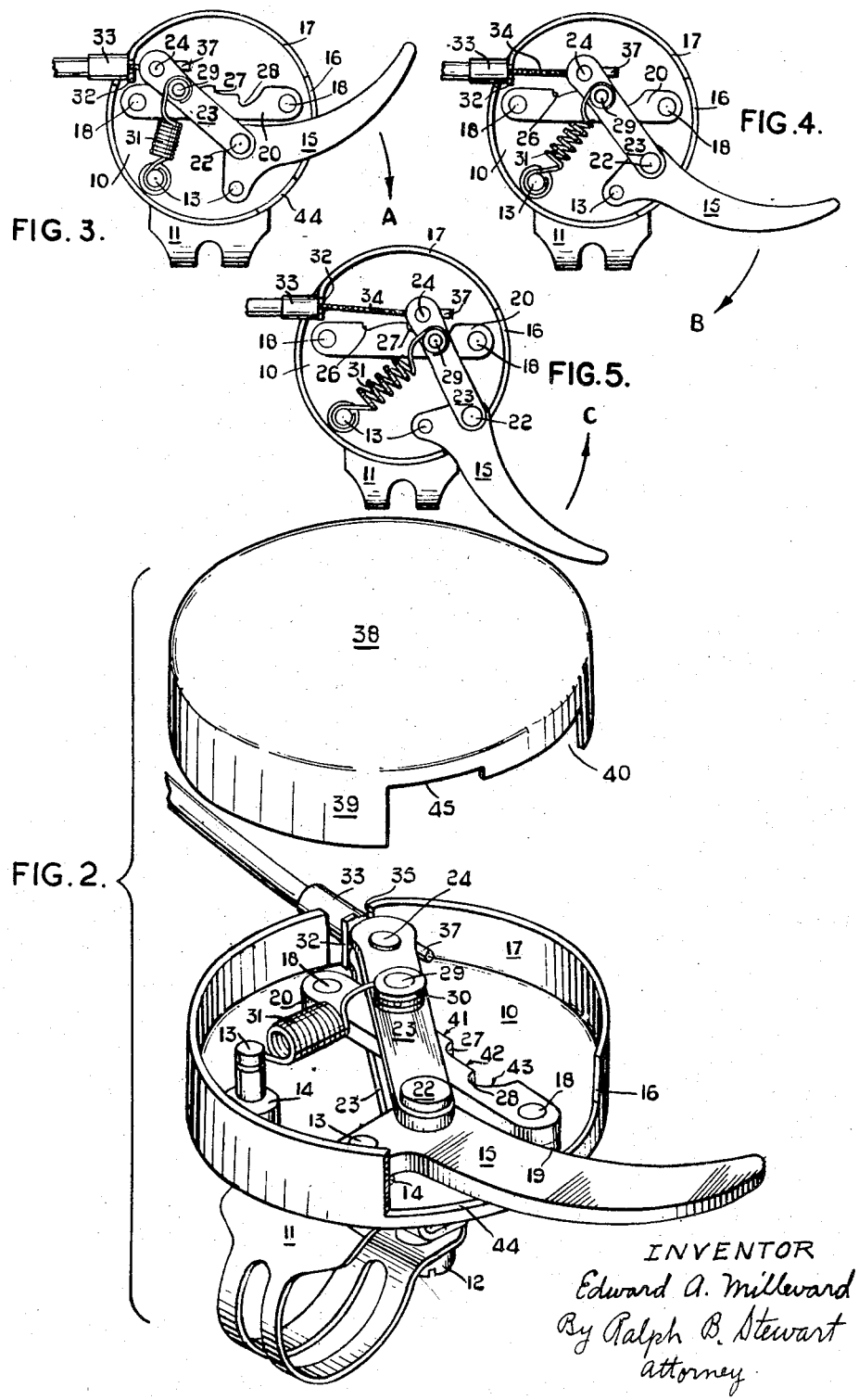

2,770,980
VARIABLE SPEED GEAR CONTROL LEVER MECHANISM FOR BICYCLES AND LIKE VEHICLES

Edward Arthur Millward, Smethwick, Birmingham, England, assignor to J. A. Phillips and Company Limited, Birmingham, England, a British company Application December 22, 1952, Serial No. 327,180

Claims priority, application Great Britain November 7, 1952

3 Claims. (Cl. 74—489)

This invention relates to improved lever control means, capable of being set in any one of a plurality of positions, for use in cable-operated mechanism and, more especially, for controlling variable speed gears for bicycles and the like in which the various positions of the control mechanism bring into use the respective gear ratios of the variable speed gear.

An object of the present invention is to provide a control mechanism of simple construction adapted to be selectively set in any one of a plurality of predetermined positions.

Another object of the present invention is to provide means enabling selective setting of the control mechanism to be effected without lost motion of any of the moving parts of the mechanism.

A further object of the present invention is to provide a compact, positively operating control mechanism adapted for attachment in a convenient position for the user on, say, the handlebars of a cycle.

A preferred manner of carrying the invention into effect is illustrated in the accompanying drawings in which:

Figure 1 is an exploded perspective view of the improved control lever mechanism for controlling a three-speed gear.

Figure 2 is a perspective view of the mechanism shown in Figure 1 assembled on a supporting base of a casing with a cover displaced in order more clearly to show the mechanism.

Figures 3, 4 and 5 are plan views of the control mechanism in alternative selected positions.

In the drawings, the control mechanism is mounted on a support which, in this instance, takes the form of a cylindrical case the flat base 10 of which carries an adjustable clip 11 whereby the case can be clamped on, say, the handlebars or a frame tube of a bicycle or the like. Adjustment of the clip 11 is by the usually clamping screw indicated at 12.

Conveniently, the clip 11 is riveted or otherwise secured to posts 13 which enter the interior of the case. The posts 13 are shouldered at 14 to provide a firm seating on the base 10 and one of these posts 13 provides a fixed pivot for one end of a cranked operating lever 15 of the third order, the other or handle end of which lever protrudes through a gap 16 in the shallow cylindrical wall 17 of the case. The gap 16 allows a desired degree of angular movement of the handle of the lever 15 around its fixed pivot post 13. It will be seen that the shoulder 14 on the pivot post 13 maintains the lever 15 clear of the base 10.

Also riveted or otherwise secured to the base 10, are a pair of spaced posts 18 which are shouldered at 19 to take a firm seating on the base 10. The posts 18 provide mounting and attachment means for a bar or similar member 20 the ends of which are pierced at 21 to take over the posts 18 which are then riveted over the bar 20 to hold the latter in fixed position relatively to the case. The shoulders 19 on the posts 18 maintain the bar 20 clear of the base 10 of the case.

Intermediate its ends, a crank or offset portion of the operating lever 15 provides a pivotal attachment or pivot pin 22 for the end of a double link 23, the parallel composing arms of which pass one above and one beneath the fixed bar 20 so as to be astride the latter element. The ends of the arms of the link 23 remote from their pivotal attachment 22 to the lever 15 pass beyond the bar 20 and are connected together by a pin or rivet 24 which has an integral collar 25 at its middle part. This collar 25 is located between the ends of the double link 23 and as the cable end is secured to it, it serves as a coupling between the cable and double link, as hereinafter more fully described.

A longitudinal edge of the rigid bar 20 which is directed away from the lever 15 is provided at 26, 27 and 28 respectively with ratchet-like notches to provide three distinct steps or stages along the length of the bar 10. Thus, the notched bar 20 forms a rack. A peg 29 adapted to engage in the notches is carried on the arms of the link 23 intermediate their ends. The twin form of the link 23 provides effective support for this peg 29 at each end so that no canting of the peg 29 under load can occur which would tend to bend the link but an equally distributed load is applied along the longitudinal axis of the link. If desired, one end of the peg 29 may project from the uppermost arm, as shown, to carry a groove, or a grooved sleeve 30 providing an anchorage for one end of a spring 31, the other end of which is suitably anchored to the support 10, such as to the post 13 near the pivot of the operating lever 15. The spring 31 is arranged normally to draw the link arms 23 towards the bar 20 so that the peg 29 will be caused to positively engage in one or the other of the notches 26, 27 and 28 in conformity with the setting of the lever 15.

The cylindrical wall 17 of the case is bent inwards at 32 to provide an abutment for one end of the sheath 33 of a flexible cable 34. The end of the cable 34 is brought through a notch or slot 35 in the bent portion 32 of the wall 17 of the case and is anchored to the collar or rivet 24 in the ends of the double link 23, thus coupling the cable thereto. Conveniently, the collar 25 is gapped at 36 to pass the cable 34 but not the enlarged nipple 37 which, in the usual manner, is secured on the extreme end of the cable. The nipple 37 takes a bearing on the collar 25 during operation of the mechanism.

A domed, or cylindrical cover 38 is provided, the cylindrical wall 39 of which is shaped to take over the wall 17 of the case. The wall 39 is suitably gapped at 40 to pass the operating lever 15. Another gap (not shown) in the cover 38 passes the sheathed end of the flexible cable 34.

In describing the operation of the control lever mechanism, it will be assumed that the end of the cable 34 remote from the control mechanism is connected to a three-speed hub gear for a bicycle. It is usual in such gears to connect the cable to a slidable member of the gear which can be made to mesh with the different gears. When a pull is applied to the cable the slidable member is moved against spring pressure in the gear, while when the pull on the cable is released the spring moves the slidable member of the gear in the opposite direction. In practice, this usual return spring of the gear may be solely relied upon normally to urge the peg 29 on the link 23 towards the notched edge of the bar 20; but it is usually preferable to employ a spring 31 as shown in the drawings to effect or assist the loading of the link towards the notched edge of the bar.

It will be seen from Figures 3, 4 and 5 that the operating lever 15 is adapted to be selectively set in any one of three predetermined angular positions defined by the particular position of the peg 29 in one of the notches 26, 27 and 28. The notches are graduated or disposed so as to suit the arrangement of gear and the movement of the cable which is necessary to effect the desired gear changes. Moreover, the lever and link act in the manner of a toggle which approaches most nearly to the spread position of the toggle in a position shown in Figure 3 with a minimum pull on the cable and tends to fold as the pull on the lever is increased.

In Figure 3, the lever 15 is set in an extreme position with the peg 29 engaging the notch 26 towards one end of the bar 20. When this position of the lever 15 is attained a high ratio of the gear may be engaged.

In Figure 4, the lever 15 is set in an intermediate position with the peg 29 engaging the intermediate notch 27 in the bar 20. This position of the lever 15 is attained by angular movement of the lever 15 in the direction of arrow A (see Figure 3) to tension the cable and cause the peg 29 or tooth to ride over an inclined surface 41 separating the notches 26 and 27 before engaging the latter. In this position of the lever 15, a normal or intermediate ratio of the gear may be engaged.

In Figure 5, the lever 15 is set in an alternative extreme position with respect to Figure 3 with the peg 29 engaging the notch 28 directed towards the other end of the bar 20. This position of the lever 15 is attained by angular displacement of the lever 15 in the direction of arrow B (see Figure 4) to increase the tension on the cable and cause the peg 29 to ride over a surface 42 separating the notches 27 and 28 before engaging the latter. In this position of the lever 15, a low ratio of the gear may be engaged.

It will be seen that the notches 26, 27 and 28 are shaped to prevent the peg 29 from falling back (i. e. to the left as viewed in Figures 3, 4 and 5) except when so moved by link 23 actuated and controlled by the operating lever 15.

When in the position shown in Figure 5, the lever 15 may be set in one of the alternative positions shown in Figures 3 and 4 by suitable angular movement in the direction of arrow C (see Figure 5). Such movement of the lever 15 will tend to slacken the cable. The lever 15 may be moved between its extreme positions without resting, other than momentarily, in its intermediate position, as the nature of the control mechanism permits the peg 29 to ride over the intermediate notch 27 provided a continued force is applied to the lever 15. Moreover, when the lever 15 is in its intermediate position, it may be moved into any one of its alternative extreme positions as desired.

When the lever 15 is in the extreme position shown in Figures 2 and 3, it will be prevented from displacement, other than movement in the direction of arrow A, by engagement of the body of the lever 15 with the bar 20. Similarly, when the lever 15 is in the extreme position shown in Figure 5, it will be prevented from angular displacement other than in the direction of arrow C by engagement of the peg 29 with an abutment surface 43 on the bar 20, or by engagement of the lever 15 with the adjacent wall 17. Enlarged portions 44 and 45 of the gaps 16 and 40 in the walls 17 and 39 respectively allow free passage of the elbow of the cranked lever 15 when it is in the position shown in Figure 5.

The improved control lever mechanism gives a smooth and positive action. The construction is simple and with a complete absence of cam surfaces. Positive retention of the cable in the selected position is afforded and the operation of the operating lever or trigger is a simple pull and push with the co-operation of the setting peg or tooth and rack bar providing a substantially in-line pull or push on the cable.

I claim:

1. Variable speed gear control lever mechanism for bicycles and like vehicles comprising a support, a bar fixed on said support, a series of notches along an edge of the bar, a lever pivoted about a fixed point on the support, a link having one end thereof pivotally connected to said lever and the other end thereof extending to the side of said bar remote from said lever, means for attaching said other end of said link to the transferring element of a variable speed gear, notch-engaging means carried by said link, and means for resiliently drawing said notch-engaging means into engagement with the notched edge of said bar whereby said notch-engaging means can be selectively engaged in any one of the notches by angular movement of the lever about its fixed pivot and relatively to the fixed bar.

2. Variable speed gear control lever mechanism for bicycles adapted to vary the tension of a sheathed flexible cable for connecting the control lever mechanism with a gear comprising a supporting casing with an upstanding wall and a removable cover, means for clamping the supporting casing on a part of a bicycle to which a gear is fitted, a rack bar fixed to said supporting casing, a lever pivoted about a fixed point on the support for angular movement, a link astride the fixed rack bar between a connection at one end about a point on the lever offset from the pivot of the latter and a coupling on the other end of the link beyond said rack bar to the flexible cable, a peg carried on the link intermediate its ends and in line with its connections to the lever and cable, and notches along an edge of the fixed rack bar confronting the peg, whereby the peg is drawn towards the notched edge of the bar by the tensioned cable and can be selectively engaged in any one of the notches according to the angular position of the lever.

3. Variable speed gear control mechanism for bicycles comprising a support and means for mounting it on the bicycle, a rack bar fixed on said support, a series of notches along an edge of the rack bar, a lever pivoted about a fixed point on the support, a linear link astride the rack bar, said link having one end pivotally connected to said lever and the other end extending to the side of said bar remote from the lever, means for attaching said other end of the link to a flexible cable of a variable speed gear, a notch-engaging peg carried by said link at an intermediate point, said notch-engaging peg having a continuation through the link to provide a spring anchorage and a spring anchored by its one end thereon and being anchored at its other end to the support in order to draw said notch-engaging peg into engagement with the notches along the edge of said rack bar.

References Cited in the file of this patent

UNITED STATES PATENTS

| 1,758,694 | Gans | May 13, 1930 |
| 2,100,619 | Wenn | Nov. 30, 1937 |
| 2,534,566 | Yapp | Dec. 19, 1950 |
| 2,555,207 | Trevaskis | May 29, 1951 |

FOREIGN PATENTS

| 20,208 | Great Britain | of 1900 |
| 228,805 | Switzerland | Jan. 3, 1944 |